Aug. 25, 1942.   R. A. GOEPFRICH   2,294,293
BRAKE
Filed Feb. 21, 1940   2 Sheets-Sheet 1

INVENTOR.
RUDOLPH A. GOEPFRICH
BY
ATTORNEY.

Aug. 25, 1942.   R. A. GOEPFRICH   2,294,293
BRAKE
Filed Feb. 21, 1940   2 Sheets-Sheet 2

INVENTOR.
RUDOLPH A. GOEPFRICH
BY
ATTORNEY.

Patented Aug. 25, 1942

2,294,293

UNITED STATES PATENT OFFICE 2,294,293

BRAKE

Rudolph A. Goepfrich, South Bend, Ind., assignor to Bendix Aviation Corporation, South Bend, Ind., a corporation of Delaware Application February 21, 1940, Serial No. 320,107

7 Claims. (Cl. 188—79.5)

This invention relates to brakes, and is illustrated as embodied in internal expanding automobile brakes.

An object of the invention is to provide an adjustable brake anchorage. Preferably the anchorage comprises a fixed part anchoringly engaged by one shoe and having a socket receiving a thrust device similarly engaged by the other shoe. This thrust device may include a sleeve and a thrust member threaded or otherwise adjustably mounted in the sleeve.

Another object of the invention is to utilize this type of anchorage in a brake having shoes which are individually shiftable to anchor at opposite ends in forward and reverse braking.

A further object is to utilize applying means (especially the emergency applying means) acting on one shoe through the above-described anchorage.

Figure 1:
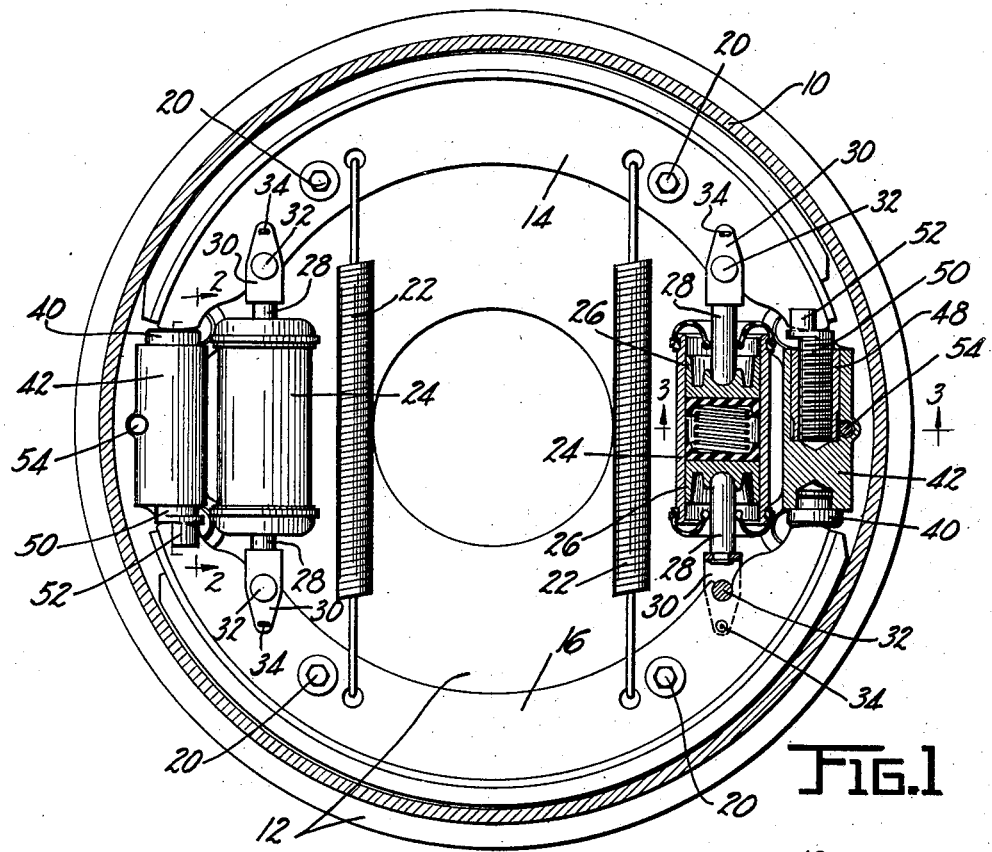
Figures 2, 3:
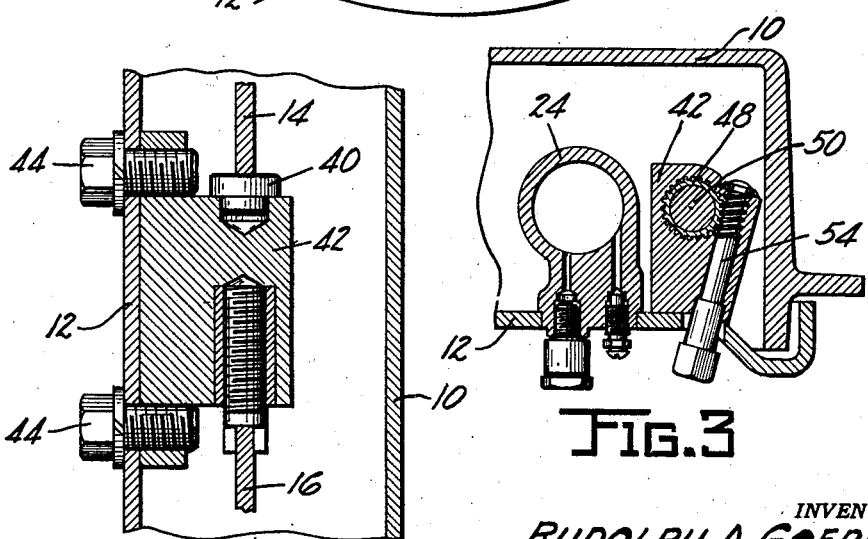
Figure 4:
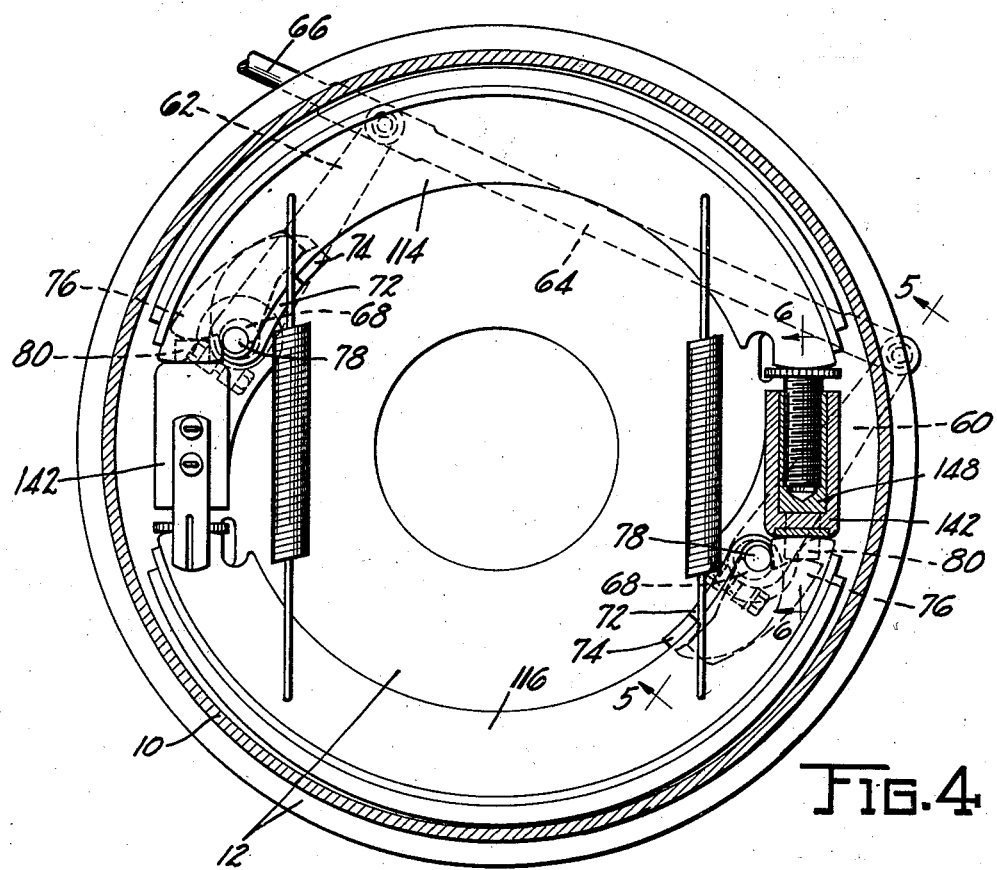
Figures 5, 6:
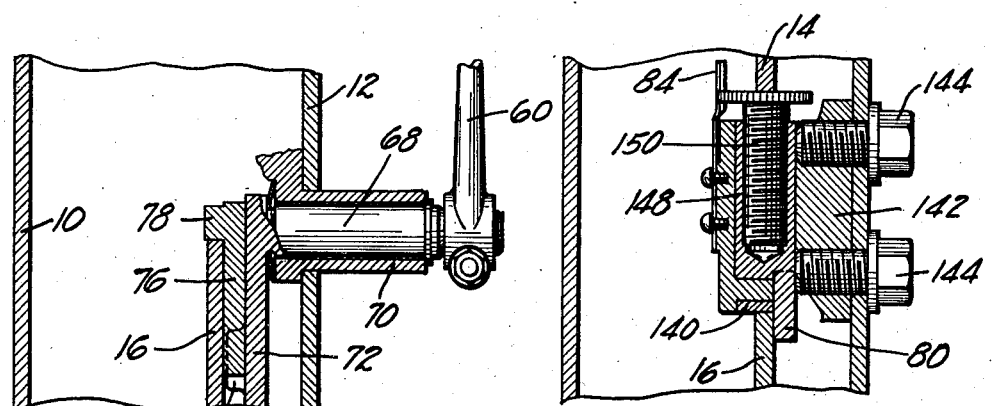

The above and other objects and features of the invention, including various novel combinations of parts and desirable particular constructions, will be apparent from the following description of the illustrative embodiments shown in the accompanying drawings, in which:

Figure 1 is a vertical section through the brake, just inside the head of the brake drum, and showing the shoes in side elevation;

Figures 2 and 3 are partial sections on the lines 2—2 and 3—3 of Figure 1;

Figure 4 is a sectional view, corresponding to Figure 1, but showing a second embodiment; and Figures 5 and 6 are partial sections on the lines 5—5 and 6—6 of Figure 4.

The brake illustrated in Figures 1-3 includes a rotatable drum 10 having a cylindrical braking flange, at the open side of which is a support such as a backing plate 12. Within the drum are shoes 14 and 16, shown as arranged to anchor at opposite ends in opposite directions of drum rotation (i. e., in forward and reverse braking). The shoes are provided with suitable steady rests 20 and return springs 22.

The brake is in this embodiment applied by hydraulic means including a pair of cylinders 24 mounted at front and rear of the backing plate and provided with pistons 26 acting on the shoes through thrust links 28. Links 28 are provided with clevises 30 carrying cross pins 32 seated in notches in the shoe webs, and having at their ends cotter pins 34 which couple them loosely to the shoe webs.

The heel end of the web of each shoe is slightly rounded, and slidably engages the head of a hardened thrust member 40 carried by an anchorage member 42 fixedly secured to the backing plate by machine screws 44.

The side of each fixed anchorage member 42 opposite the hardened member 40 is formed with a socket receiving a sleeve 48 into which is threaded a thrust member 50 having its end engaged by the end of the other of the shoes and provided with a pair of lugs 52 embracing the end of the shoe web. The exterior of the sleeve 48 is shown formed with a worm thread, or small gear, meshing with a worm on an adjusting member 54 which is journaled in the anchorage member 42 and the end of which extends through and is accessible from the outside of the backing plate.

Turning the adjusting member 54 turns the sleeve 48 and, since lugs 52 prevent the thrust member 50 from turning, this forces member 50 outwardly to compensate for wear of the brake lining.

The brake of Figures 4-6, while mechanically actuated, is generally similar to the first embodiment. Parts which are the same are indicated by the same reference characters, while those which are functionally closely similar are indicated by the same reference characters increased by 100.

The mechanical applying means includes levers 60 and 62 connected by a link 64 and actuated by a link or other connection 66. The levers are fixedly clamped on the ends of shaft 68 journaled in bosses 70 extending from the anchorage member 142 through the backing plate. Each shaft 68 has fixed on its inner end an arm 72 provided with a lug 74 engaging the edge of a floating lever 76 formed with a cylindrical lug 78 seated in a notch in the end of the shoe web, and serving as a fulcrum for the lever.

The levers 76 lie close beside the shoe webs and, spaced outwardly toward the drum from the fulcrums 78, they engage segment-shaped projections 80 which are integral with the adjustment sleeves 148 and pass through openings in the bottoms of the sockets in the anchorage members 142. Thus rocking the levers 60 and 62 causes force to be applied in opposite directions on pin 78 and projection 80 of sleeves 148 at each side of the brake. Thus each lever acts directly on one shoe and through the thrust device 148—150 on the other.

Adjustment, in this embodiment, is accomplished by turning the thrust members 150. Spring pawls 84 yieldingly interlock with teeth on the thrust members 150, to preserve the adjustment.

While two illustrative embodiments have been described in detail, it is not my intention to limit the scope of the invention to those particular embodiments or otherwise than by the terms of the appended claims.

I claim:

1. A brake comprising a support provided with shoes and with applying means therefor, and anchorage means for the shoes including a device fixedly mounted on the support and which device at one side has anchoring engagement with one shoe and which device at its other side is formed with a socket, together with a sleeve seated in said socket and a thrust member threaded into the sleeve and formed at its end for anchoring engagement with the other shoe, the shoes each having at both ends thereof sliding engagement with the respective anchoring surfaces.

2. A brake comprising a support provided with shoes fully floating in both directions of rotation and with applying means therefor, and anchorage means for the shoes including a device fixedly mounted on the support and which device at one side has anchoring engagement with one shoe and which device at its other side is formed with a socket, together with a sleeve seated in said socket and a thrust member threaded into the sleeve and formed at its end for anchoring engagement with the other shoe, and a threaded adjusting member for relatively turning the sleeve and thrust member to adjust for wear.

3. A brake comprising a support provided with shoes and with applying means therefor, and anchorage means for the shoes including a device fixedly mounted on the support and which device at one side has anchoring engagement with one shoe and which device at its other side is formed with a socket, together with a sleeve seated in said socket and a thrust member threaded into the sleeve and formed at its end for anchoring engagement with the other shoe, and means extending through the support for relatively turning the sleeve and thrust member to adjust for wear.

4. A brake comprising a support provided with shoes and with applying means therefor, and anchorage means for the shoes including a device fixedly mounted on the support and which device at one side has anchoring engagement with one shoe and which device at its other side is formed with a socket, together with a sleeve seated in said socket and a thrust member threaded into the sleeve and formed at its end for anchoring engagement with the other shoe, said sleeve having a worm thread on its exterior, and a worm member extending through the support and meshing with said worm thread for relatively turning the sleeve and thrust member to adjust for wear.

5. A brake comprising a support provided with a pair of shoes, a pair of hydraulic applying cylinders for spreading the shoes, and a pair of anchorages between opposite ends of the shoes, each of which anchorages includes a device fixedly mounted on the support and which device at one side has anchoring engagement with the end of one shoe and at its other side is formed with a socket, together with a sleeve seated in said socket and a thrust member threaded into the sleeve and formed at its end for anchoring engagement with the end of the other shoe.

6. A brake comprising a support provided with a pair of shoes, a pair of anchorages between opposite ends of the shoes, and a pair of hydraulic applying cylinders adjacent the ends of the shoes and nearer the center of the brake drum than the said anchorages, each of the anchorages including a device fixedly mounted on the support which device at one side has anchoring engagement with the end of one shoe and at its other side is formed with a socket having a sleeve seated therein and a thrust member threaded into the sleeve and formed at its end for anchoring engagement with the end of the other shoe.

7. A brake comprising a support provided with a pair of shoes, a pair of anchorages between opposite ends of the shoes, and a pair of hydraulic applying cylinders adjacent the ends of the shoes and nearer the center of the brake drum than the said anchorages, each of the anchorages including a device fixedly mounted on the support which device at one side has anchoring engagement with the end of one shoe and at its other side is formed with a socket having a sleeve seated therein and a thrust member threaded into the sleeve and formed at its end for anchoring engagement with the end of the other shoe, and means for relatively turning the sleeve and thrust member to adjust for wear.

RUDOLPH A. GOEPFRICH.